May 26, 1931.    H. J. BURNISH    1,807,565
PIPE THREAD PROTECTOR
Filed Sept. 12, 1927
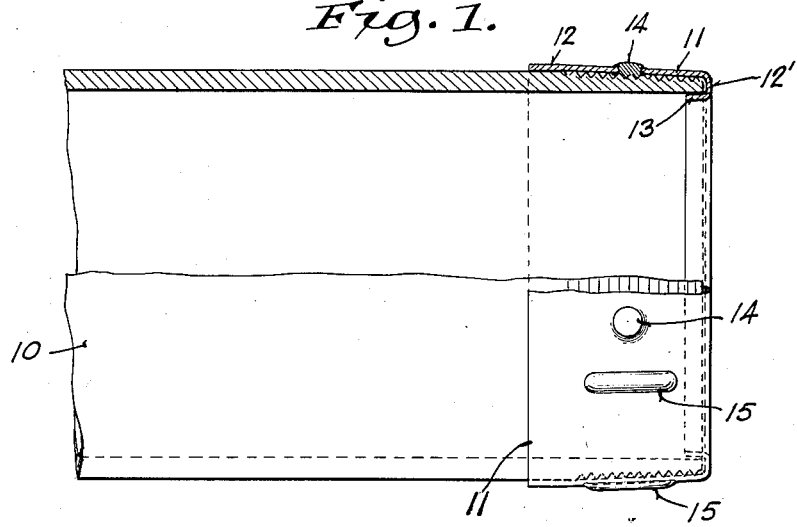
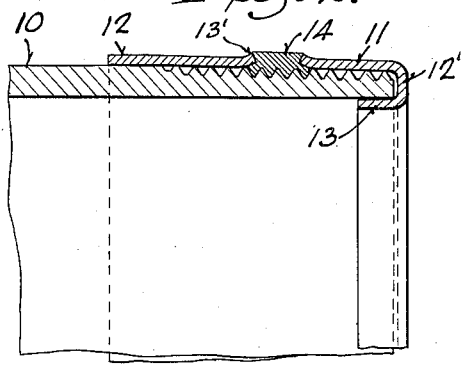
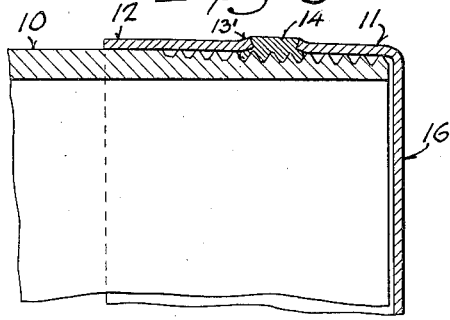
WITNESS:
INVENTOR.
HOWARD J. BURNISH
BY
ATTORNEYS.

Patented May 26, 1931

1,807,565

UNITED STATES PATENT OFFICE

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

PIPE THREAD PROTECTOR

Application filed September 12, 1927. Serial No. 219,022.

The present invention relates to devices for protecting lengths of pipe against damage to the threaded ends thereof.

The invention resides in a new construction of thread protector, produced in the form of a sheet metal cap or sleeve, which is readily positioned upon the threaded end of a pipe so as to cover the threads by merely slipping it thereover. The protector is constructed so as to closely embrace an unthreaded section of the pipe next adjoining its threaded end, and to enclose the end of the pipe also, so as to effectively exclude moisture, dirt and other deleterious substances from access to the threaded portion and prevent injury thereto. In another form of the invention, the thread protecting cap or sleeve closes the open end of the pipe.

The invention further resides in a simple yet very efficient means for securing the thread protector in position upon the end of the pipe. Such means consist preferably of a soft metal plug adapted to be driven through a transverse perforation in the axially extending wall of the thread protector, the plug being adapted at its inner end to engage the threads and assume the form of the latter in the flow and spread of the soft metal of the plug over the threads, thus firmly securing the thread protector from outward axial movement along the pipe. The soft metal plugs thus driven form complemental screw threads in the pipe protector, so that by a simple rotation to unscrew the thread protector, the latter may be easily removed from the end of the pipe, without damage to the threads thereof.

My invention in several forms will now be described in detail, and the novelty thereof will be pointed out in the appended claims.

In the accompanying drawings:

Figure 1 is a view in side elevation, with a portion broken away and sectioned, showing one form of my thread protector as applied to the end of a pipe.

Fig. 2 is a like view somewhat enlarged, showing a section of the pipe and in detail the manner of the engagement of the thread protector therewith.

Fig. 3 is a like view showing the invention in its simple form.

In the drawings, the numeral 10 indicates a portion of pipe, threaded at one end.

My improved thread protector is formed as a cap or sleeve from sheet metal, and is of general annular form. It is desirable in all forms of the invention that the axial dimensions of the thread protector exceed somewhat the length of the threaded portion of the pipe, so that the open end of the thread protector may pass completely over and beyond the threaded end of the pipe, and closely embrace an unthreaded band lying next to the threaded portion. This is illustrated in Figs. 1 and 2, in which the numeral 11 indicates the cap or shell constituting my new thread protector, it having a slightly tapering wall to correspond with the tapering threaded end of the pipe, such wall terminating in a rim portion 12 which embraces the pipe beyond the threaded end thereof and lies parallel or substantially parallel to the pipe. The close joint thus produced at the open end of the thread protector acts quite effectively to exclude the entrance of moisture, dirt or other substances, at that point.

The opposite or bottom end of the cap or shell 11 forming the thread protector is returned at 12′, so as to stand transversely to the axis of the thread protector, and abut the end of the pipe when the protector 11 is positioned thereon. The extreme edge of the bottom end of the thread protector is further returned as at 13, so as to lie approximately parallel with the axis of the thread protector, and thus complete the enclosure of the circular wall of the pipe, this arrangement serving to exclude substances from access to the threads, as before. In this manner, the threads of the pipe are efficiently protected from injury by impact during shipment and handling, up to the time that the pipe is to be installed for use.

The thread protector 11 is applied by slipping it over the threaded end of the pipe, so as to completely enclose the latter. In order to secure the thread protector 11 in position upon the end of the pipe, the said protector is provided previously in its axially extending wall with one or a plurality of radial perforations, which may be given a slight flare outwardly, as indicated at 13'. Into such perforations, plugs 14 of suitable soft metal are driven, these plugs expanding under the pressure so as to fill the flared openings, and taking the conformation of the threads on the end of the pipe, as is shown in Fig. 2. The attaching operation is easily performed, and the plugs 14 are securely retained against accidental displacement by spreading beyond the diameter of the perforations in the wall of the thread protector.

When it is desired to make use of the pipe, the thread protector 11 can be easily removed from the pipe by simply unscrewing, inasmuch as in the insertion of the soft metal plugs 14 through the perforations in the thread protector 11, the latter is provided with threads complementary to those on the end of the pipe. To facilitate the operation of the removal, the thread protector may be provided with outward embossments 15, as shown in Fig. 1, upon the circumference thereof.

In the formation of the thread protector shown in Figs. 1 and 2, a disk of sheet metal having a center perforation is first provided, and the side walls of the cap or shell formed in a drawing operation, the metal of the disk surrounding the perforation being utilized in forming the returned portions 12' and 13.

Fig. 3 illustrates the invention in what might be regarded as its simplest form. The thread protector shown is struck from a sheet metal disk in the form of a cup with a flat bottom 16, which latter embraces the end of the pipe and serves to exclude foreign matter from entering therein.

In Figs. 1, 2 and 3, the taper of the thread protector 11 corresponds with that of the threaded end of the pipe, so that the said protector, if in contact with the threads, will bear evenly upon the crests of the threads, and thus distribute and sustain the pressures of impact without damage to the threads. But in driving the plugs 14 into position, it is found that such plugs have a tendency to space the thread protector slightly from the threaded end of the pipe, so that contact of the protector 11 with the threads on the pipe is purely incidental, and not harmful.

The use of the present invention effects a great economy in the art, inasmuch as after the thread protectors have been unscrewed from the ends of the pipe, they are made serviceable for re-use by simply punching the soft metal fillers or plugs 14 out of the openings 13', and so nothing of value is wasted. No other conditioning of the thread protectors is necessary for such re-use.

It is also within the scope of my invention to form the plugs 14, by pouring a small quantity of molten soft metal, heated only to a state of fluidity, into the perforations 13' in the side wall of the thread protector. Such molten metal quickly freezes in a small mass upon contact with the cold surface of the pipe 10, and forms the expanded plugs which secure the thread protector in position upon the pipe. The cast plugs should be peened to counteract the shrinkage due to sudden cooling of the metal.

Having thus described my invention, what I claim and desire to secure by Letters Patents of the United States, is:—

1. A thread protector formed as a metal shell with perforations in its wall and adapted to shield the threads to be protected, and means comprising separate soft metal plugs seated in the perforations in the wall of the shell and adapted to engage the threads to detachably secure the shell in protecting position in relation to the threads.

2. A thread protector formed as a shell adapted to be passed over the threaded end of a pipe to protect the threaded portion thereof, and means comprising soft metal plugs imbedded in perforations in the thread protector and adapted to engage the threads on the pipe to detachably secure the thread protector in protecting position upon the pipe.

3. A thread protector formed as a shell adapted to be passed over the threaded end of a pipe to protect the threaded portion thereof, said protector having a length in excess of that of the threaded portion of the pipe to extend at its inner end over the adjacent unthreaded portion of the pipe and closed at its outer end, and means comprising soft metal plugs imbedded in perforations in the thread protector and adapted to engage the threads on the pipe to detachably secure the thread protector in protecting position upon the pipe.

4. A thread protector formed as a shell adapted to be passed over the threaded end of a pipe to protect the threaded portion thereof, the said protector having a length in excess of that of the threaded portion of the pipe to extend at its inner end over the adjacent unthreaded portion of the pipe and returned at its outer end to abut the end of the pipe, and means comprising soft metal plugs imbedded in perforations in the thread protector and adapted to engage the threads on the pipe to detachably secure the thread protector in protecting position upon the pipe.

5. A thread protector formed as a shell adapted to be passed over the threaded end of a pipe to protect the threaded portion thereof, the said thread protector being formed in its bottom with a circular groove having substantially parallel walls to embrace the end of the pipe, and means comprising soft metal plugs imbedded in perforations in the thread protector and adapted to engage the threads on the pipe to detachably secure the thread protector in protecting position upon the pipe.

6. The process of protecting the threaded ends of pipes, which consists in forming a metal cap or shell of suitable diameter and perforating the side wall thereof, placing the said cap or shell upon the end of the pipe so as to cover the threads thereof, inserting soft metal through the perforations in the wall of the cap or shell, and effecting engagement of such soft metal with the threads of the pipe, to detachably secure the cap or shell in protecting position.

7. The process of protecting the threaded ends of pipes, which consists in forming a metal cap or shell of suitable diameter and perforating the side wall thereof, placing the said cap or shell upon the end of the pipe so as to cover the threads thereof, driving soft metal plugs through the perforations in the wall of the cap or shell and into engagement with the threads of the pipe, thereby forming complemental threads in the cap or shell and detachably securing the cap or shell in protecting position.

8. A thread protector comprising an annular shell adapted to shield the threads to be protected, and soft metal plugs extending through perforations in said shell and adapted to engage the threads to be protected to thereby detachably retain said shell in position.

9. A thread protector comprising a shell adapted to shield the threads to be protected, a return bend portion at one end of said shell adapted to engage the end portion of the threaded article, and soft metal plugs imbedded in the walls of said shell and adapted to engage the threads to be protected to detachably retain said protector in protecting relation to the threads.

10. A thread protector comprising an annular shell adapted to shield the threads to be protected and having perforations therein, the edges of the shell at the perforations being struck outwardly away from the threads, and soft metal plugs fastened in said perforations and adapted to engage the threads to retain said shell in position.

In testimony whereof, I have signed my name at Milwaukee, this 7th day of September, 1927.

HOWARD J. BURNISH.